United States Patent
Pan et al.

(10) Patent No.: US 10,952,230 B1
(45) Date of Patent: Mar. 16, 2021

(54) METHOD AND APPARATUS FOR SUPPORTING QOS (QUALITY OF SERVICE) FLOW TO DRB (DATA RADIO BEARER) REMAPPING FOR SIDELINK COMMUNICATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/071,145

(22) Filed: Oct. 15, 2020

Related U.S. Application Data

(60) Provisional application No. 62/927,332, filed on Oct. 29, 2019.

(51) Int. Cl.
*H04W 72/12* (2009.01)
*H04W 76/14* (2018.01)
*H04W 92/18* (2009.01)

(52) U.S. Cl.
CPC ....... *H04W 72/1263* (2013.01); *H04W 76/14* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 10,187,928 B2 | 1/2019 | Karandikar et al. | |
| 2007/0291788 A1* | 12/2007 | Sammour | H04W 28/06 370/466 |
| 2017/0288886 A1* | 10/2017 | Atarius | H04L 65/1063 |
| 2019/0313295 A1* | 10/2019 | Xu | H04W 36/0044 |
| 2019/0320362 A1* | 10/2019 | Liu | H04W 36/06 |
| 2019/0349805 A1* | 11/2019 | Cheng | H04W 28/0268 |
| 2019/0373666 A1* | 12/2019 | Khan | H04L 47/34 |
| 2020/0008113 A1* | 1/2020 | Chen | H04W 36/18 |
| 2020/0037132 A1* | 1/2020 | Wu | H04W 8/005 |
| 2020/0037190 A1* | 1/2020 | Wu | H04W 28/0278 |

(Continued)

OTHER PUBLICATIONS

3GPP TSG-RAN2 Meeting #103, Gothenburg, Sweden, Aug. 20-24, 2018, R2-18187584.

*Primary Examiner* — Bunjob Jaroenchonwanit

(74) *Attorney, Agent, or Firm* — Blue Capital Law Firm, P.C.

(57) ABSTRACT

A method and apparatus are disclosed from the perspective of a first User Equipment (UE) to support PC5 QoS flow to SL-DRB (Sidelink-Data Radio Bearer) remapping. In one embodiment, the method includes the first UE establishing a sidelink communication with a second UE. The method further includes the first UE mapping a PC5 QoS flow of the sidelink communication to a first SL-DRB. The method also includes the first UE transmitting a PC5 RRC (Radio Resource Control) message to the second UE, wherein the PC5 RRC message indicates the PC5 QoS flow is mapped to a second SL-DRB. In addition, the method includes the first UE transmitting an end-marker control PDU (Protocol Data Unit) to the second UE after successful transmission of the PC5 RRC message has been confirmed by lower layer(s) or after receiving a PC5 RRC complete message corresponding to the PC5 RRC message from the second UE.

16 Claims, 17 Drawing Sheets

(56) References Cited

U.S. PATENT DOCUMENTS

| | | | |
|---|---|---|---|
| 2020/0053600 A1* | 2/2020 | Jang | H04W 28/26 |
| 2020/0059817 A1* | 2/2020 | Baek | H04W 28/0273 |
| 2020/0100156 A1* | 3/2020 | Liu | H04W 76/22 |
| 2020/0128431 A1* | 4/2020 | Jo | H04W 72/1284 |
| 2020/0163005 A1* | 5/2020 | Rao | H04W 8/005 |
| 2020/0169913 A1* | 5/2020 | Byun | H04W 80/08 |
| 2020/0178123 A1* | 6/2020 | Shan | H04W 28/0257 |
| 2020/0178204 A1* | 6/2020 | Chen | H04W 68/005 |
| 2020/0229249 A1* | 7/2020 | Cheng | H04W 76/14 |
| 2020/0245113 A1* | 7/2020 | Kang | H04W 4/06 |
| 2020/0245184 A1* | 7/2020 | Jin | H04W 28/02 |
| 2020/0245394 A1* | 7/2020 | Wu | H04W 4/20 |
| 2020/0252989 A1* | 8/2020 | Chen | H04W 80/08 |
| 2020/0267790 A1* | 8/2020 | Kim | H04W 76/14 |
| 2020/0296619 A1* | 9/2020 | Pan | H04W 28/12 |
| 2020/0314613 A1* | 10/2020 | Lee | H04W 4/40 |
| 2020/0314959 A1* | 10/2020 | Agiwal | H04W 76/27 |
| 2020/0323019 A1* | 10/2020 | Vargas | H04W 76/23 |
| 2020/0344637 A1* | 10/2020 | Kim | H04W 4/40 |
| 2020/0359445 A1* | 11/2020 | Wu | H04L 5/0051 |

\* cited by examiner

Legend:
- PC5-U: The SDAP/PDCP/RLC/MAC/PHY functionality is specified in TS 38.300.
- For PDCP SDU type "Non-IP", a "Non-IP Type" header included in the SDU by upper layer to indicate the type of non-IP messages carried will be specified in stage 3 specification.

METHOD AND APPARATUS FOR SUPPORTING QOS (QUALITY OF SERVICE) FLOW TO DRB (DATA RADIO BEARER) REMAPPING FOR SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. No. 62/927,332 filed on Oct. 29, 2019, the entire disclosure of which is incorporated herein in its entirety by reference.

FIELD

This disclosure generally relates to wireless communication networks, and more particularly, to a method and apparatus for supporting QoS flow to DRB remapping for sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first User Equipment (UE) to support PC5 QoS flow to SL-DRB (Sidelink-Data Radio Bearer) remapping. In one embodiment, the method includes the first UE establishing a sidelink communication with a second UE. The method further includes the first UE mapping a PC5 QoS flow of the sidelink communication to a first SL-DRB. The method also includes the first UE transmitting a PC5 RRC (Radio Resource Control) message to the second UE, wherein the PC5 RRC message indicates the PC5 QoS flow is mapped to a second SL-DRB. In addition, the method includes the first UE transmitting an end-marker control PDU (Protocol Data Unit) to the second UE after successful transmission of the PC5 RRC message has been confirmed by lower layer(s) or after receiving a PC5 RRC complete message corresponding to the PC5 RRC message from the second UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V16.0.0, "Architecture enhancements for 5G System (5GS) to support Vehicle-to-Everything (V2X) services (Release 16)"; TR 38.885 V16.0.0, "NR; Study on NR Vehicle-to-Everything (V2X) (Release 16)"; 3GPP email discussion [107bis#13] "Running CR to TS38.300 for NR V2X_v4"; 3GPP email discussion [107bis#12] "Running CR to TS37.324 for 5G_V2X_NRSL_v4"; and 3GPP RAN2#106

Chairman's note. The standards and documents listed above are hereby expressly incorporated by reference in their entirety.

Figure 1:
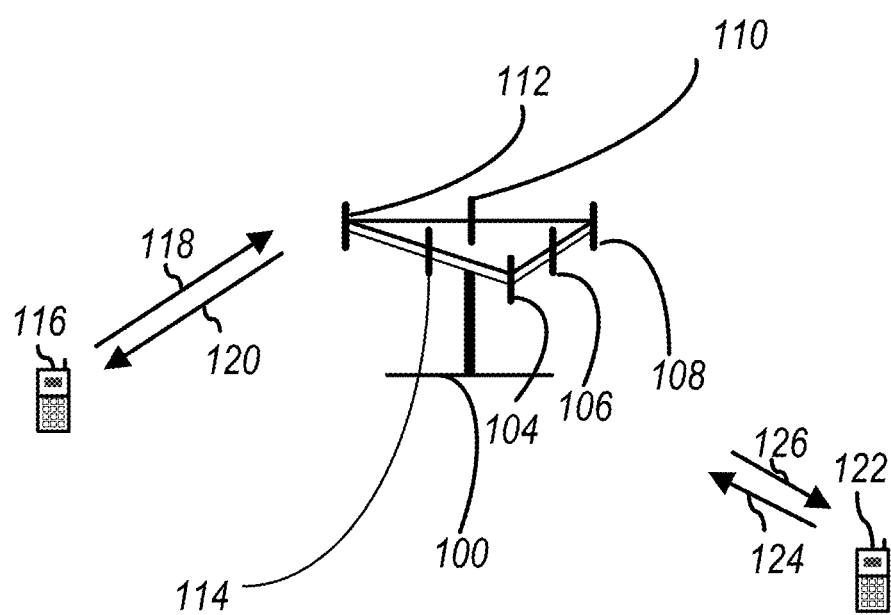
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
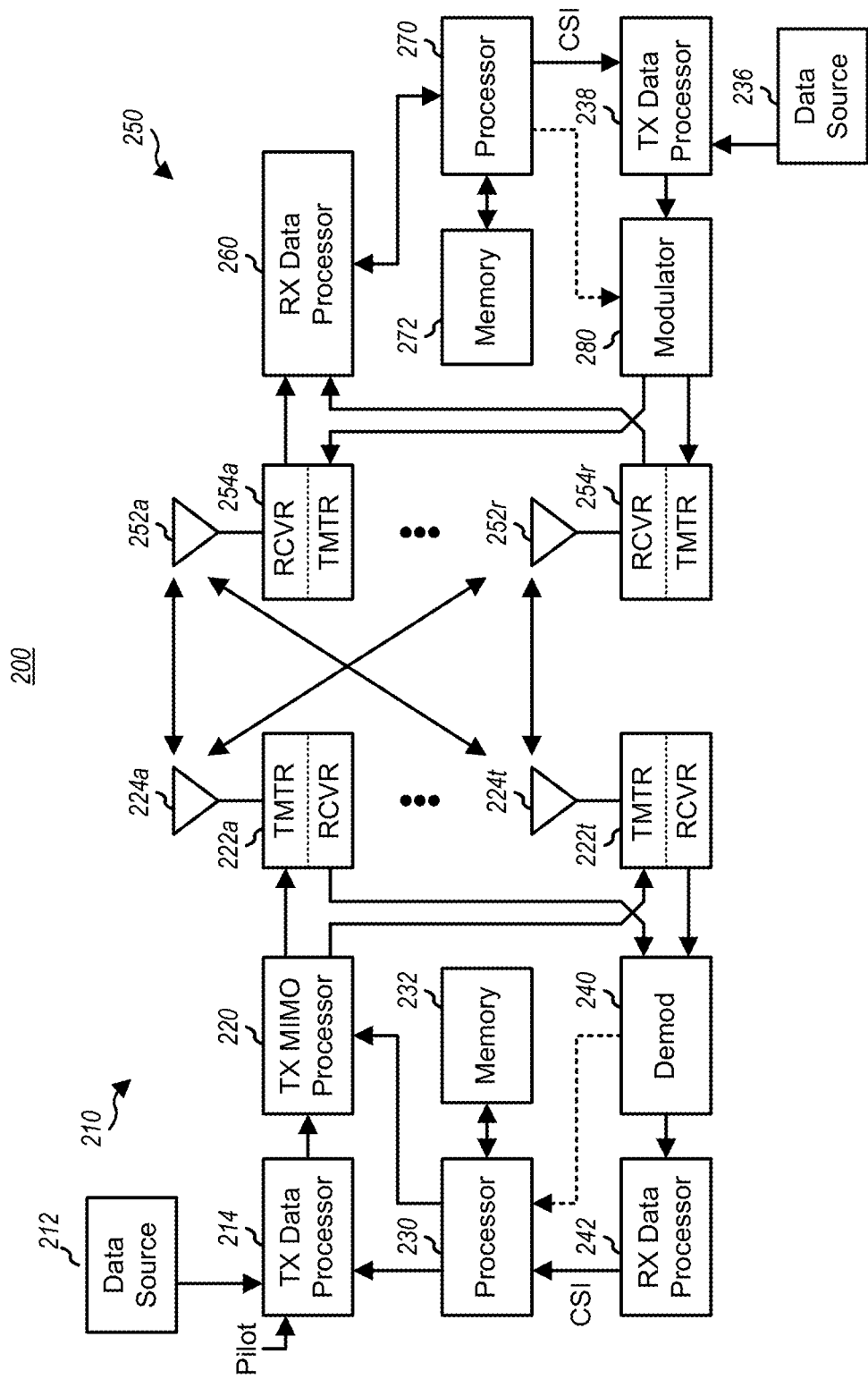
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
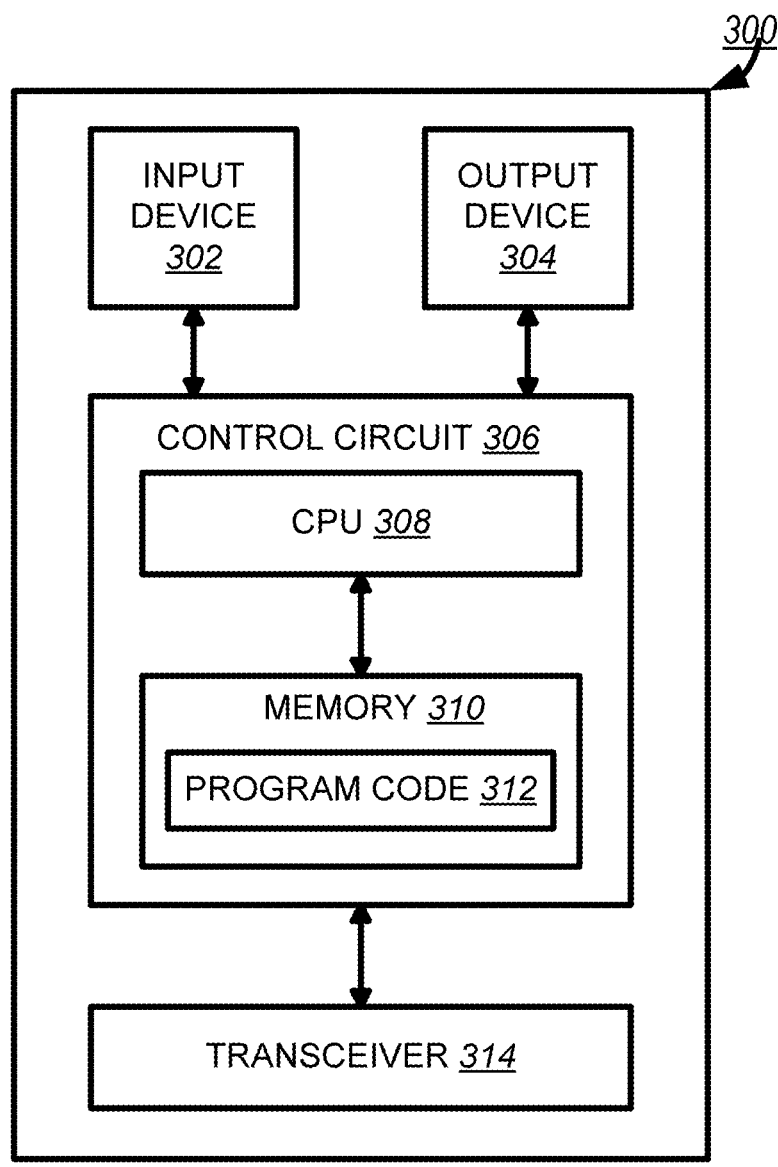
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
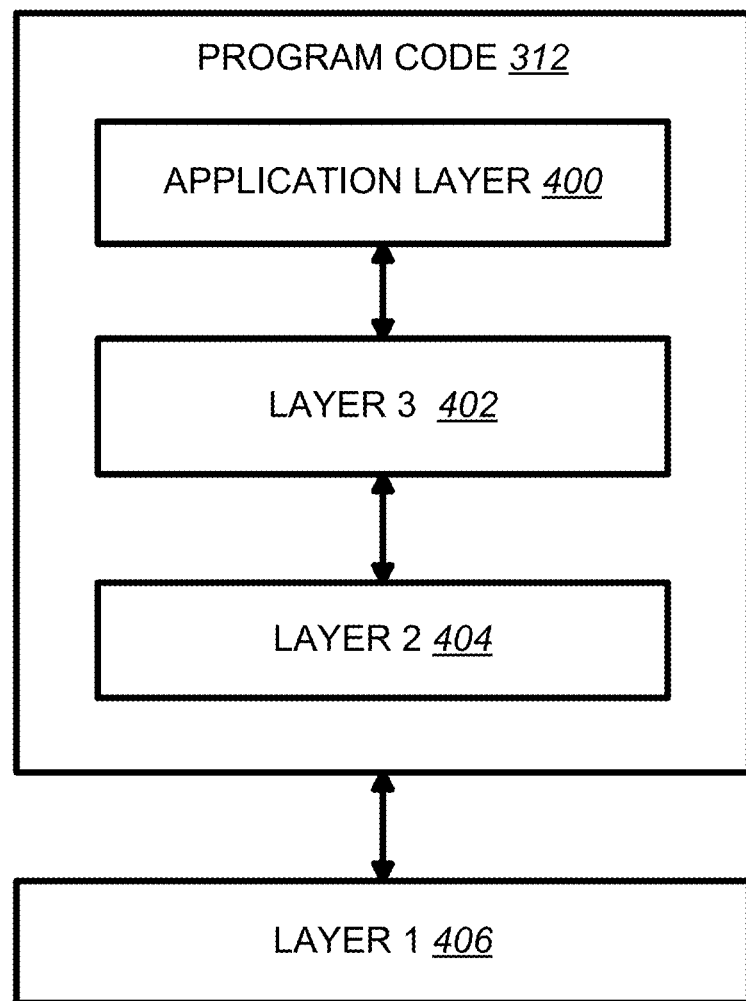
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies V2X (Vehicle-to-Everything) communication as follows:

5.2 V2X Communication 5.2.1 V2X Communication Over PC5 Reference Point 5.2.1.1 General For V2X communication, two types of PC5 reference points exist: the LTE based PC5 reference point as defined in TS 23.285 [8], and the NR based PC5 reference point as defined in clause 4.2.3. A UE may use either type of PC5 or both for V2X communication depending on the services the UE supports. The V2X communication over PC5 reference point supports roaming and inter-PLMN operations. V2X communication over PC5 reference point is supported when UE is "served by NR or E-UTRA" or when the UE is "not served by NR or E-UTRA".

A UE is authorized to transmit and receive V2X messages when it has valid authorization and configuration as specified in clause 5.1.2.

The V2X communication over PC5 reference point has the following characteristics:
  V2X communication over LTE based PC5 reference point is connectionless, i.e. broadcast mode at Access Stratum (AS) layer, and there is no signalling over PC5 for connection establishment.
  V2X communication over NR based PC5 reference point supports broadcast mode, groupcast mode, and unicast mode at AS layer. The UE will indicate the mode of communication for a V2X message to the AS layer. Signalling over control plane over PC5 reference point for unicast mode communication management is supported.
  V2X services communication support between UEs over PC5 user plane.
  V2X messages are exchanged between UEs over PC5 user plane.
    Both IP based and non-IP based V2X messages are supported over PC5 reference point.
    For IP based V2X messages, only IPv6 is used. IPv4 is not supported.

The identifiers used in the V2X communication over PC5 reference point are described in clause 5.6.1. UE decides on the type of PC5 reference point and Tx Profile to use for the transmission of a particular packet based on the configuration described in clause 5.1.2. When the LTE based PC5 reference point is selected, the QoS handling corresponding procedures are defined in TS 23.285 [8]. When NR based PC5 reference point is selected, the QoS handling and procedures are defined in clauses 5.4.1 and 6.3.

If the UE has an ongoing emergency session via IMS, the ongoing emergency session via IMS shall be prioritized over V2X communication over PC5 reference point.
  NOTE: The emergency session via IMS setup is based on appropriate regional/national regulatory requirements and operator policies as defined in TS 23.501 [6].

5.2.1.4 Unicast Mode Communication Over PC5 Reference Point

Figure 5:
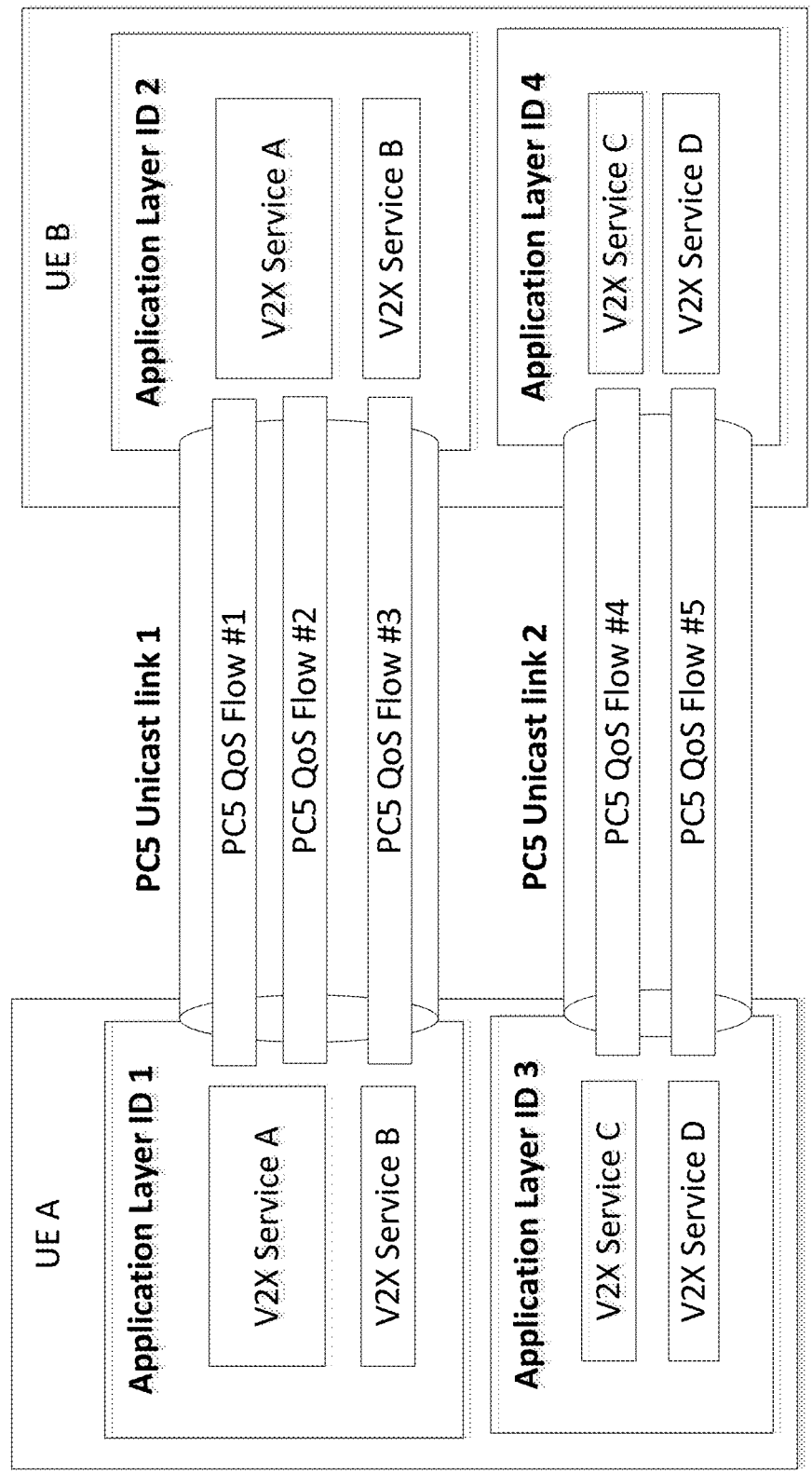
FIG. 5 is a reproduction of FIG. 5.2.1.4-1 of 3GPP TS 23.287 V16.0.0.

Unicast mode of communication is only supported over NR based PC5 reference point. FIG. 5.2.1.4-1 illustrates an example of PC5 unicast links.
  [FIG. 5.2.1.4-1 of 3GPP TS 23.287 V16.0.0, entitled "Example of PC5 Unicast Links", is reproduced as FIG. 5]

The following principles apply when the V2X communication is carried over PC5 unicast link:
  A PC5 unicast link between two UEs allows V2X communication between one or more pairs of peer V2X services in these UEs. All V2X services in the UE using the same PC5 unicast link use the same Application Layer ID.
  NOTE 1: An Application Layer ID may change in time as described in clauses 5.6.1.1 and 6.3.3.2, due to privacy. This does not cause a re-establishment of a PC5 unicast link.
  One PC5 unicast link supports one or more V2X services (e.g. PSIDs or ITS-AIDS) if these V2X services are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
  NOTE 2: A source UE is not required to know whether different target Application Layer IDs over different PC5 unicast links belong to the same target UE.
  A PC5 unicast link supports V2X communication using a single network layer protocol e.g. IP or non-IP.
  A PC5 unicast link supports per-flow QoS model as specified in clause 5.4.1.

When the Application layer in the UE initiates data transfer for a V2X service which requires unicast mode of communication over PC5 reference point:
  the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise
  the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:
- service type(s) (e.g. PSID or ITS-AID), Application Layer ID and Layer-2 ID of UE A; and
- Application Layer ID and Layer-2 ID of UE B; and
- network layer protocol used on the PC5 unicast link; and
- for each V2X service, a set of PC5 QoS Flow Identifier(s) (PFI(s)). Each PFI is associated with QoS parameters (i.e. PQI and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

[ . . . ]

6.1.1 User Plane for NR PC5 Reference Point Supporting V2X Services

Figure 6:
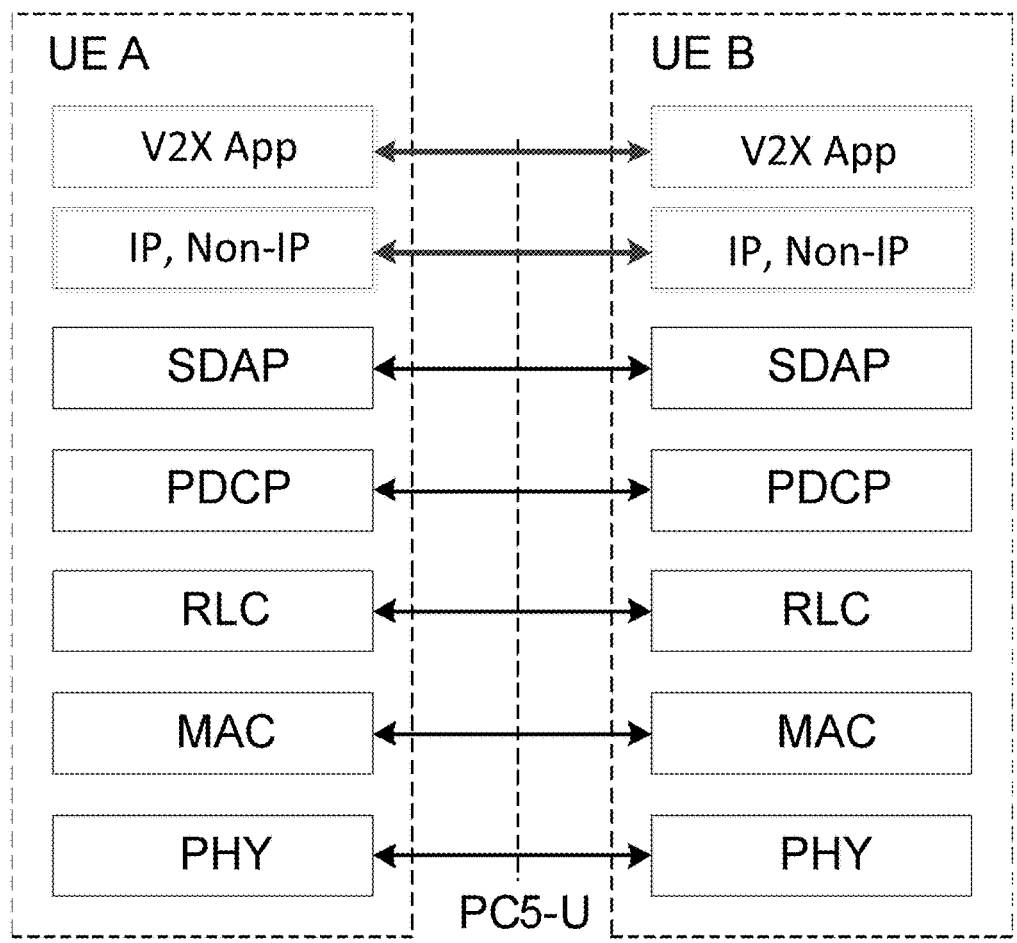
FIG. 6 is a reproduction of FIG. 6.1.1-1 of 3GPP TS 23.287 V16.0.0.

[FIG. 6.1.1-1 of 3GPP TS 23.287 V16.0.0, entitled "User Plane for PC5 interface", is reproduced as FIG. 6]

IP and Non-IP PDCP SDU types are supported for the V2X communication over PC5.

For IP PDCP SDU type, only IPv6 is supported. The IP address allocation and configuration are as defined in clause 5.6.1.1.

The Non-IP PDCP SDU contains a Non-IP Type header, which indicates the V2X message family used by the application layer, e.g. IEEE 1609 family's WSMP [18], ISO defined FNTP [19].

NOTE: The Non-IP Type header and allowed values will be defined in stage 3 specification.

3GPP TS 38.885 V16.0.0 specifies QoS management for NR V2X sidelink as follows:

7 QoS Management

QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.

For SL unicast, groupcast and broadcast, QoS parameters of V2X packets are provided by upper layers to the AS. For SL unicast, the SLRBs are (pre-)configured based on the signalling flows and procedures shown in FIGS. 7-1 and 7-2. The per-flow QoS model described in [6] is assumed in upper layers.

Figure 7:
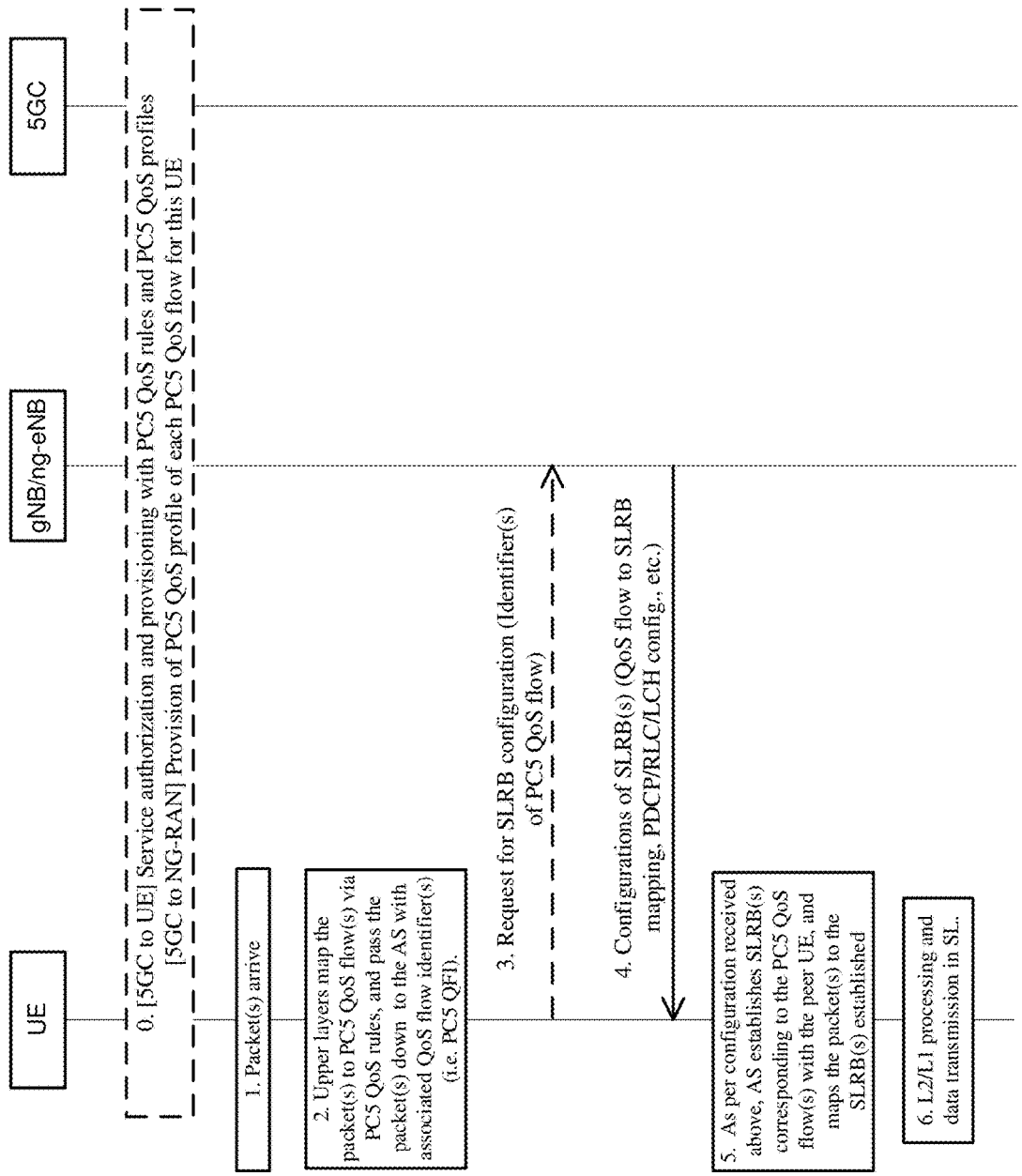
FIG. 7 is a reproduction of FIG. 7-1 of 3GPP TR 38.885 V16.0.0.

[FIG. 7-1 of 3GPP TR 38.885 V16.0.0, entitled "SLRB configuration for SL unicast (UE-specific)", is reproduced as FIG. 7]

In Step 0 of FIG. 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.

[ . . . ]

3GPP Running CR to TS 38.300 for NR V2X_v4 (as discussed in the 3GPP email discussion [107bis#13] "Running CR to TS38.300 for NR V2X_v4") published after RAN2#107bis meeting captures agreements on sidelink as follows:

16.x Sidelink 16.x.1 General

In this subclause, an overview of NR sidelink communication and how NG-RAN supports NR sidelink communication and V2X sidelink communication is given. V2X sidelink communication are specified in TS 36.300 [2].

Figure 16:
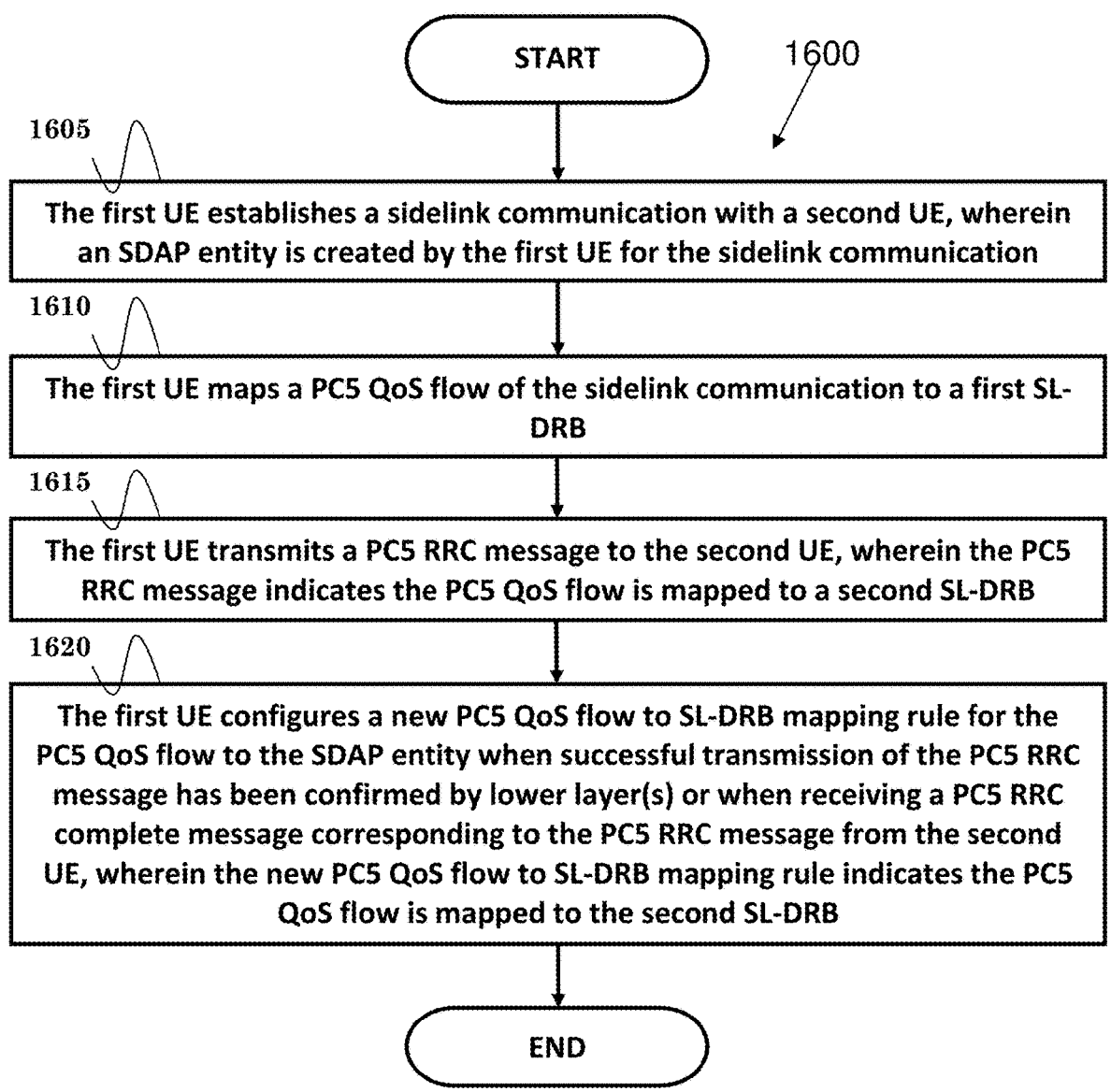
FIG. 16 is a flow chart according to one exemplary embodiment.

The NG-RAN architecture supports the PC5 interface as illustrated in FIG. 16.x.1-1. Sidelink transmission and reception over the PC5 interface are supported when the UE is inside NG-RAN coverage, irrespective of which RRC state the UE is in, and when the UE is outside NG-RAN coverage.

Figure 8:
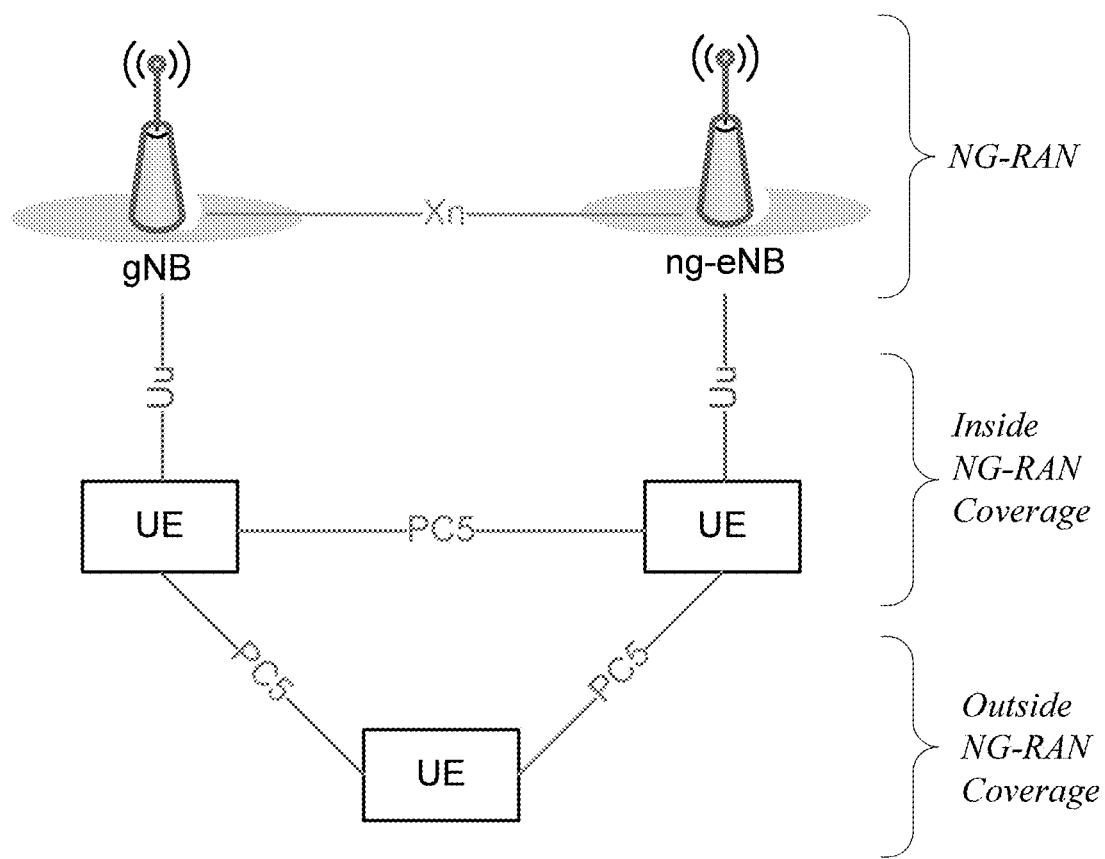
FIG. 8 is a reproduction of FIG. 16.x.1-1 of the 3GPP email discussion [107bis#13] "Running CR to TS38.300 for NR V2X_v4".

[FIG. 16.x.1-1 of the 3GPP email discussion [107bis#13] "Running CR to TS38.300 for NR V2X_v4", entitled "NG-RAN Architecture supporting the PC5 interface", is reproduced as FIG. 8]

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

Unicast transmission, characterized by:
- Support of one PC5-RRC connection between peer UEs for the pair;
- Transmission and reception of control information and user traffic between peer UEs in sidelink;
- Support of sidelink HARQ feedback;
- Support of RLC AM;
- Support of sidelink RLM for the PC5-RRC connection to detect RLF.

Groupcast transmission, characterized by:
- Transmission and reception of user traffic among UEs belonging to a group in sidelink;
- Support of sidelink HARQ feedback.

Broadcast transmission, characterized by:
- Transmission and reception of user traffic among UEs in sidelink;

16.x.2 Radio Protocol Architecture for NR Sidelink Communication 16.x.2.1 Overview The AS protocol stack for the control plane in the PC5 interface consists of RRC, PDCP, RLC and MAC sublayers, and the physical layer. The protocol stack of PC5-C for RRC is shown in FIG. 16.x.2.1-1.

Figure 9:
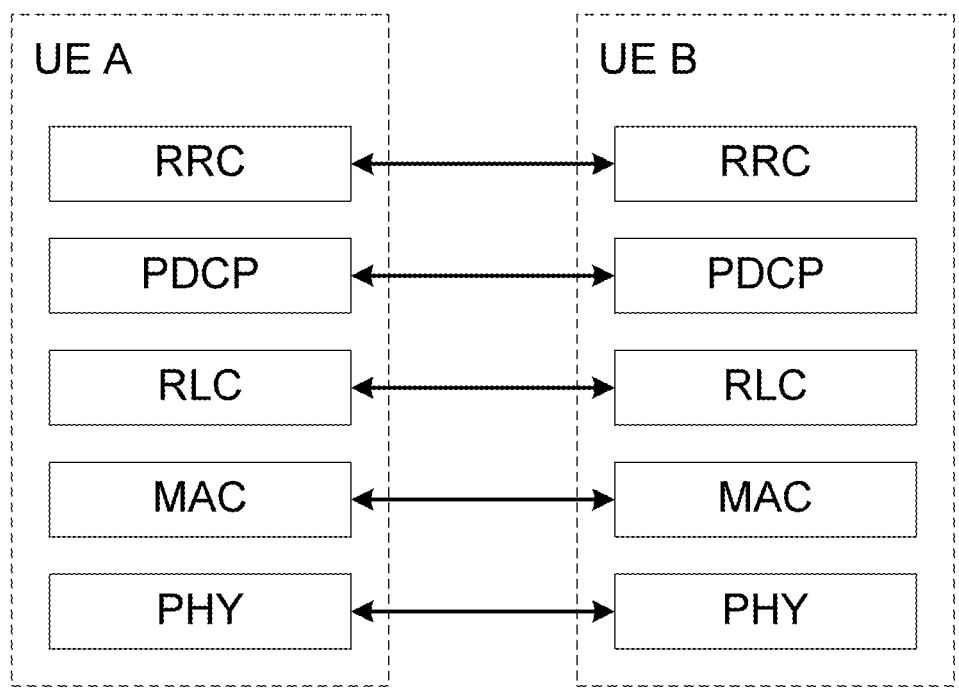
FIG. 9 is a reproduction of FIG. 16.x.2.1-1 of the 3GPP email discussion [107bis#13] "Running CR to TS38.300 for NR V2X_v4".

[FIG. 16.x.2.1-1 of the 3GPP email discussion [107bis#13] "Running CR to TS38.300 for NR V2X_v4", entitled "PC5 control plane (PC5-C) protocol stack for RRC", is reproduced as FIG. 9]

For support of PC5-S protocol specified in TS 22.287 [xx], PC5-S is located on top of PDCP, RLC and MAC sublayers, and the physical layer for the control plane in the PC5 interface as shown in FIG. 16.x.2.1-2.

Figure 10:
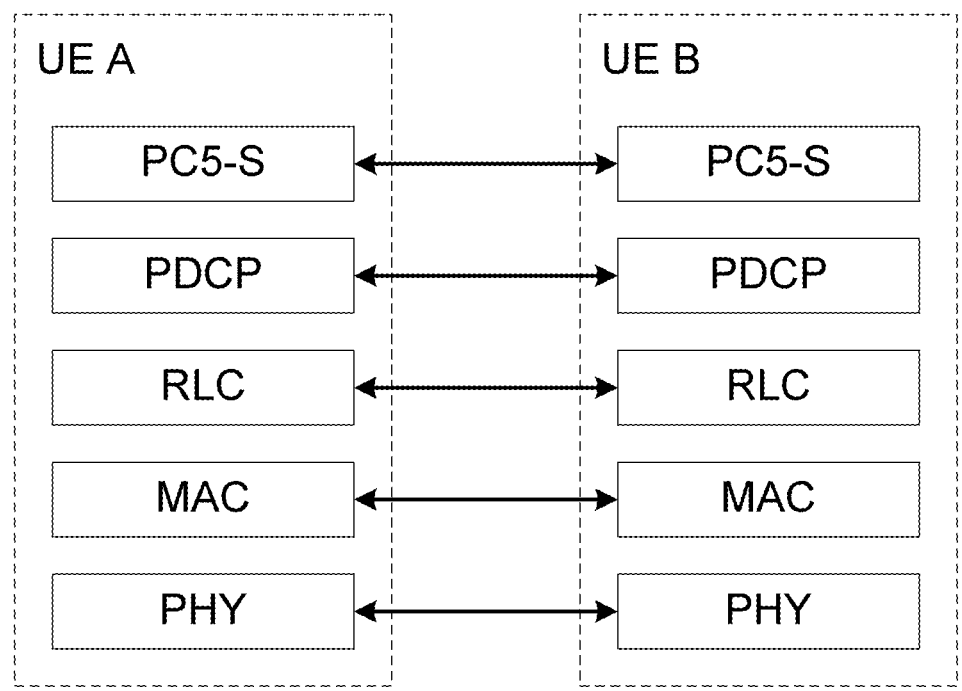
FIG. 10 is a reproduction of FIG. 16.x.2.1-2 of the 3GPP email discussion [107bis#13] "Running CR to TS38.300 for NR V2X_v4".

[FIG. 16.x.2.1-2 of the 3GPP email discussion [107bis#13] "Running CR to TS38.300 for NR V2X_v4", entitled "PC5 control plane (PC5-C) protocol stack for PC5-S.", is reproduced as FIG. 10]

Editor's Note: FFS on control plane protocol stack for SBCCH, i.e. FFS on need of PDCP The AS protocol stack for user plane in the PC5 interface consists of SDAP, PDCP, RLC and MAC sublayers, and the physical layer. The protocol stack of PC5-U is shown in FIG. 16.x.2.1-3.

Figure 11:
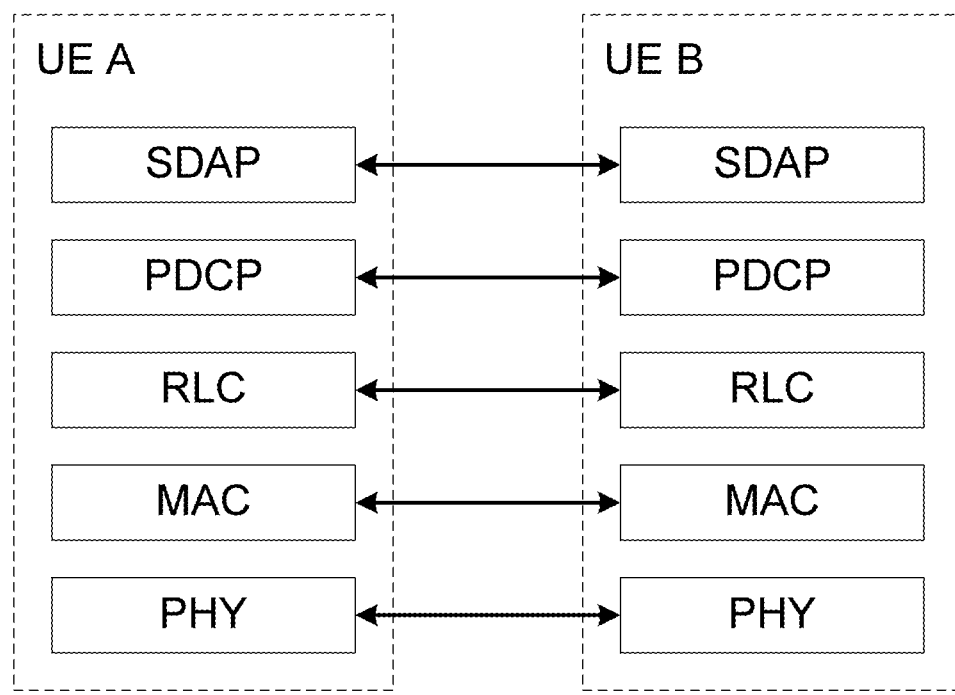
FIG. 11 is a reproduction of FIG. 16.x.2.1-3 of the 3GPP email discussion [107bis#13] "Running CR to TS38.300 for NR V2X_v4".

[FIG. 16.x.2.1-3 of the 3GPP email discussion [107bis#13] "Running CR to TS38.300 for NR V2X_v4", entitled "PC5 user plane (PC5-11) protocol stack", is reproduced as FIG. 11]

Sidelink Radio bearers (SLRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

16.x.2.2 MAC

The MAC sublayer provides the following services and functions over the PC5 interface in addition to the services and functions specified in subclause 6.2.1:

Radio resource selection;
Packet filtering;

Editor's Note: FFS for packet filtering in case of groupcast and unicast as in TR 38.885.

Priority handling between uplink and sidelink transmissions for a given UE.

With LCP restrictions in MAC, only sidelink logical channels belonging to the same destination can be multiplexed into a MAC PDU for one of unicast, groupcast and broadcast which is associated to the destination. NG-RAN can also control whether a sidelink logical channel can utilise the resources allocated to a configured sidelink grant Type 1 (see subclause 10.x).

For packet filtering, a SL-SCH MAC header including a Source Layer-2 ID and a Destination Layer-2 ID is added to each MAC PDU.

Editor's Note: FFS whether the SL-SCH MAC header includes full IDs or a portion of the IDs based on SCI information.

The following logical channels are used in sidelink:

Sidelink Control Channel (SCCH): a sidelink channel for transmitting control information from one UE to other UE(s);
Sidelink Traffic Channel (STCH): a sidelink channel for transmitting user information from one UE to other UE(s);
Sidelink Broadcast Control Channel (SBCCH): a sidelink channel for broadcasting sidelink system information from one UE to other UE(s).

The following connections between logical channels and transport channels exist:

SCCH can be mapped to SL-SCH;
STCH can be mapped to SL-SCH;
SBCCH can be mapped to [SL-BCH].

Editor's Note: FFS for mapping between a transport channel and SBCCH.

16.x.2.3 RLC

The services and functions of the RLC sublayer as specified in subclause 6.3.2 are supported for sidelink. TM is used for SBCCH. Either UM or AM is used in unicast transmission while UM is used in groupcast or broadcast transmission. For UM, only uni-directional transmission is supported for groupcast and broadcast.

Editor's Note: Support of bi-directional UM for unicast is FFS.

Editor's Note: FFS on RLC mode(s) used for carrying PC5-S and PC5-RRC messages. Editor's Note: FFS on the need of RLC reestablishment for NR sidelink.

16.x.2.4 PDCP

The services and functions of the PDCP sublayer as specified in subclause 6.4.1 are supported for sidelink with some restrictions:

Out-of-order delivery is supported only for unicast transmission;
Duplication is not supported over the PC5 interface in this version of the specification.

Editor's Note: FFS on need of Out-of-order delivery for groupcast and broadcast.

16.x.2.5 SDAP

The SDAP sublayer provides the following service and function over the PC5 interface:

Mapping between a QoS flow and a sidelink data radio bearer.

There is one SDAP entity per destination for one of unicast, groupcast and broadcast which is associated to the destination. Reflective QoS is not supported over the PC5 interface in this version of the specification.

16.x.2.6 RRC

The RRC sublayer provides the following services and functions over the PC5 interface:

Transfer of a PC5-RRC message between peer UEs;
Maintenance of a sidelink AS context related to a PC5-RRC connection between two UEs;
Detection of sidelink radio link failure for a PC5-RRC connection.

Separate PC5-RRC procedures and messages are used to transfer UE capability and AS-layer configuration including SLRB configuration of the peer UE. Both peer UEs can exchange their own UE capability and AS-layer configuration using separate bi-directional procedures in both sidelink directions.

Editor's Note: FFS on whether the two messages can be transmitted together in the same MAC PDU.

A PC5-RRC connection is a logical connection between two UEs for a pair of Source and Destination Layer-2 IDs. Each of the PC5-RRC connections is used to establish a sidelink AS context after a corresponding PC5-S unicast link is established as specified in TS 23.287 [xx]. There is one-to-one correspondence between the PC5-RRC connection and the PC5-S unicast link. A UE may have multiple PC5-RRC connections with one or more UEs for different pairs of source and destination Layer-2 IDs. If the UE receives a PC5-RRC message from the peer UE, the UE can store at least sidelink related UE capability information from the PC5-RRC message as a sidelink AS context for the PC5-RRC connection.

Editor's Note: FFS whether AS configuration information can be also stored in SL UE context.

Editor's Note: FFS on whether a one-to-many PC5-RRC message can be supported for groupcast.

[ . . . ]

3GPP Running CR to TS37.324 for 5G_V2X_NRSL_v4 (as discussed in the 3GPP email discussion [107bis#12] "Running CR to TS37.324 for 5G_V2X_NRSL_v4") published after RAN2#107bis meeting captures agreements on sidelink (as captured in the 3GPP RAN2#106 Chairman's note) as follows:

4 General
4.1 Introduction

The objective is to describe the SDAP architecture and the SDAP entity from a functional point of view. The specified functionality only applies to UE with connection to the 5G-CN and UE in unicast, groupcast or broadcast for NR SL communications.

4.2 SDAP Architecture
4.2.1 SDAP Structure

FIG. 4.2.1-1 illustrates one possible structure for the SDAP sublayer; it should not restrict implementation. The figure is based on the radio interface protocol architecture defined in 3GPP TS 38.300 [2].

Figure 12:
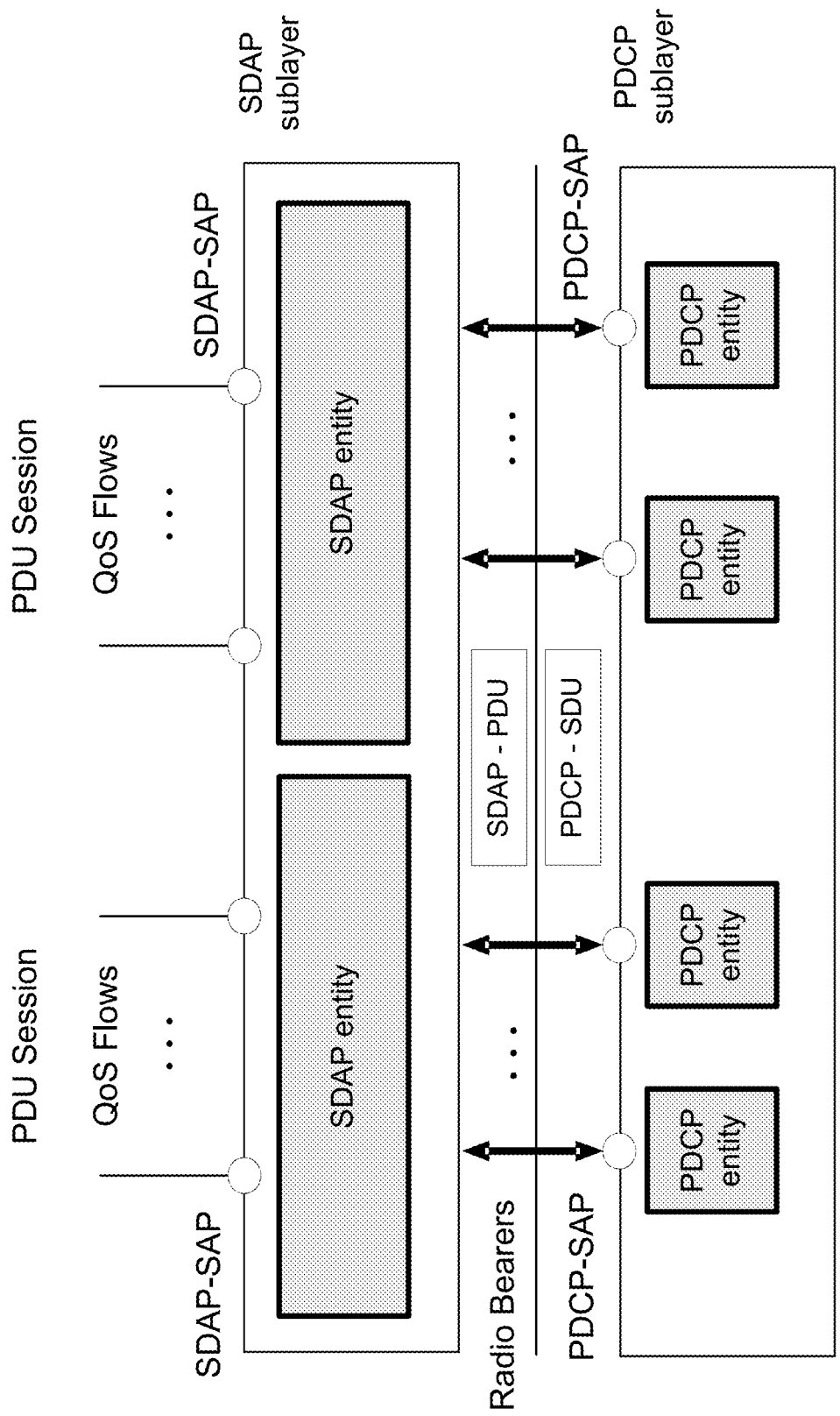
FIG. 12 is a reproduction of FIG. 4.2.1-1 of the 3GPP email discussion [107bis#12] "Running CR to TS37.324 for 5G_V2X_NRSL_v4".

[FIG. 4.2.1-1 of the 3GPP email discussion [107bis#12] "Running CR to TS37.324 for 5G_V2X_NRSL_v4", entitled "SDAP sublayer, structure view", is reproduced as FIG. 12]

The SDAP sublayer is configured by RRC (3GPP TS 38.331 [3]) and for NR SL communication the SDAP can also be configured by SIB or pre-configured. The SDAP sublayer maps QoS flows to DRBs. One or more QoS flows may be mapped onto one DRB. One QoS flow is mapped onto only one DRB at a time in the UL.

In SL communication, the SDAP sublayer maps PC5 QoS flows to SL-DRBs. One or more PC5 QoS flows may be mapped onto one SL-DRB. One PC5 QoS flow is mapped onto only one SL-DRB at a time in the SL.

4.2.2 SDAP Entities

The SDAP entities are located in the SDAP sublayer. Several SDAP entities may be defined for a UE. There is an SDAP entity configured for each individual PDU session. For SL, SDAP entity is configured per Destination Layer2 Identity and cast type in the UE.

An SDAP entity receives/delivers SDAP SDUs from/to upper layers and submits/receives SDAP data PDUs to/from its peer SDAP entity via lower layers.

At the transmitting side, when an SDAP entity receives an SDAP SDU from upper layers, it constructs the corresponding SDAP data PDU and submits it to lower layers;

At the receiving side, when an SDAP entity receives an SDAP data PDU from lower layers, it retrieves the corresponding SDAP SDU and delivers it to upper layers.

FIG. 4.2.2-1 illustrates the functional view of the SDAP entity for the SDAP sublayer; it should not restrict implementation. The figure is based on the radio interface protocol architecture defined in 3GPP TS 38.300 [2].

Figure 13:
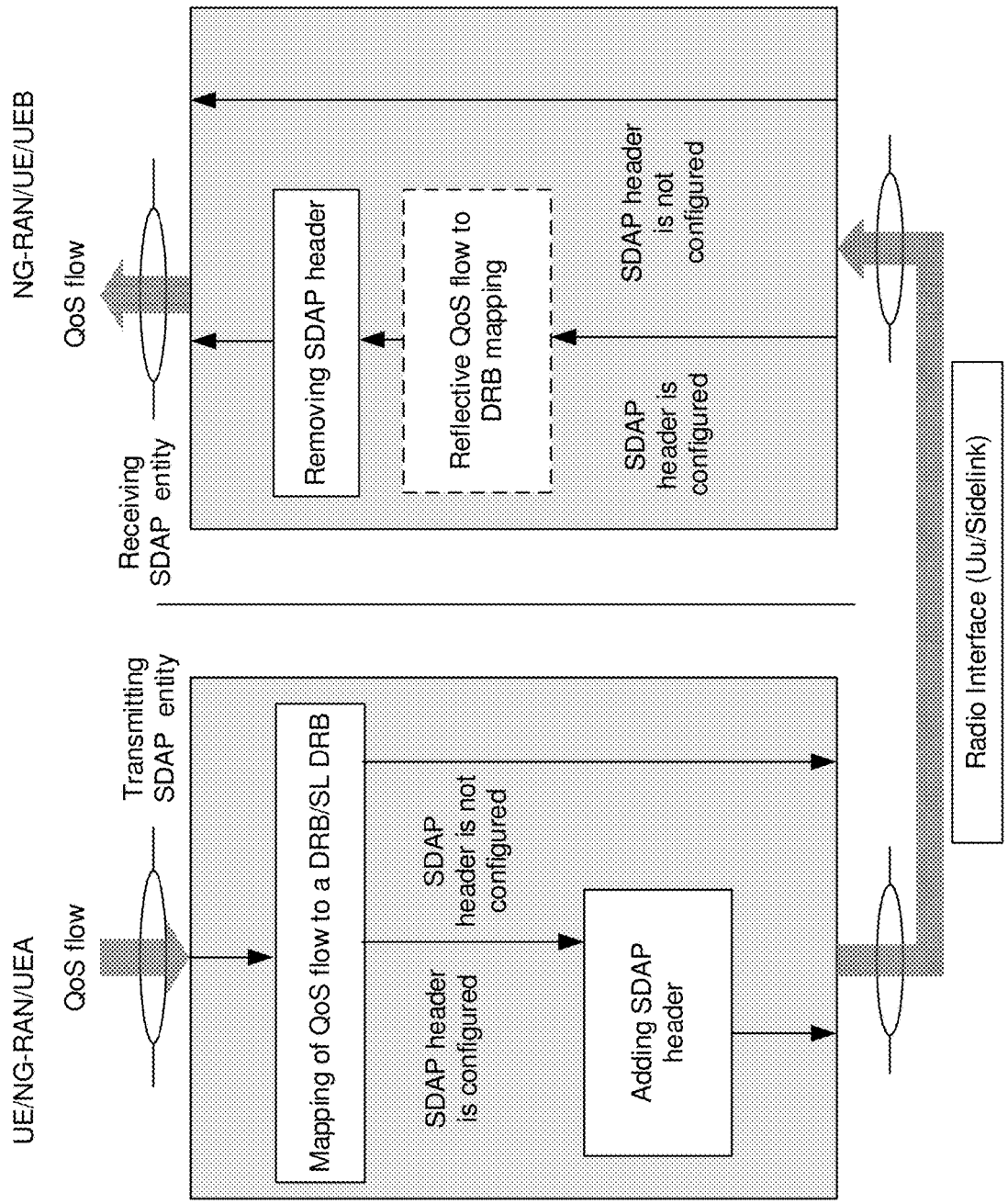
FIG. 13 is a reproduction of FIG. 4.2.2-1 of the 3GPP email discussion [107bis#12] "Running CR to TS37.324 for 5G_V2X_NRSL_v4".

[FIG. 4.2.2-1 of the 3GPP email discussion [107bis#12] "Running CR to TS37.324 for 5G_V2X_NRSL_v4", entitled "SDAP layer, functional view", is reproduced as FIG. 13]

Reflective QoS flow to DRB mapping is performed at UE, as specified in the subclause 5.3.2, if DL SDAP header is configured.

For NR SL communication, reflective PC5 QoS flow to SL-DRB mapping is not supported.

4.3 Services
4.3.1 Services Provided to Upper Layers

The SDAP sublayer provides its service to the user plane upper layers. The following services are provided by SDAP to upper layers:

transfer of user plane data.

4.3.2 Services Expected from Lower Layers

An SDAP entity expects the following services from lower layers:

user plane data transfer service;
in-order delivery except when out of order delivery is configured by RRC (3GPP TS 38.331 [3]).

4.4 Functions

The SDAP sublayer supports the following functions:
transfer of user plane data;
mapping between a QoS flow and a DRB for both DL and UL;
mapping between a PC5 QoS flow and a SL-DRB for NR SL communication;
marking QoS flow ID in both DL and UL packets;
marking PC5 QoS flow ID in unicast of NR SL communication packets;
reflective QoS flow to DRB mapping for the UL SDAP data PDUs.

5 SDAP Procedures
5.1 SDAP Entity Handling
5.1.1 SDAP Entity Establishment

When RRC (3GPP TS 38.331 [3]) requests an SDAP entity establishment, the UE shall:
establish an SDAP entity;
follow the procedures in subclause 5.2.

When RRC (3GPP TS 38.331 [3]) requests establishment of an SDAP entity for unicast of NR SL communication or groupcast and broadcast of NR SL communications, the UE shall:
establish an SDAP entity;
follow the procedures in subclauses 5.2.X and 5.2.Y.

5.1.2 SDAP Entity Release

When RRC (3GPP TS 38.331 [3]) requests an SDAP entity release, the UE shall:
release the SDAP entity.

When RRC (3GPP TS 38.331 [3]) requests release of an SDAP entity for unicast of NR SL communication or groupcast and broadcast of NR SL communication, the UE shall:
release the SDAP entity.

5.2 Data Transfer [ . . . ]
5.2.X SL Transmission

At the reception of an SDAP SDU from upper layer for a PC5 QoS flow, the transmitting SDAP entity shall:
if there is no stored PC5 QoS flow to SL-DRB mapping rule for the PC5 QoS flow as specified in the subclause 5.X:
map the SDAP SDU to the default SL-DRB;
else:
map the SDAP SDU to the SL-DRB according to the stored PC5 QoS flow to SL-DRB mapping rule;
if the SL-DRB to which the SDAP SDU is mapped is configured by RRC (3GPP TS 38.331 [3]) with the presence of SDAP header,
construct the SL SDAP data PDU as specified in the subclause 6.2.2.X;

else:
   construct the SL SDAP data PDU as specified in the subclause 6.2.2.1;
   submit the constructed SL SDAP data PDU to the lower layers.

5.2.Y SL Reception

At the reception of an SDAP data PDU from lower layers for a PC5 QoS flow, the receiving SDAP entity shall:
   if the SL-DRB from which this SDAP data PDU is received is configured by RRC (3GPP TS 38.331 [3]) with the presence of SDAP header:
     retrieve the SDAP SDU from the SL SDAP data PDU as specified in the subclause 6.2.2.X.
   else:
     retrieve the SDAP SDU from the SL SDAP data PDU as specified in the subclause 6.2.2.1;
   deliver the retrieved SDAP SDU to the upper layer.
   Editor's Notes: FFS whether the receiver behavior upon remapping is left to UE implementation

[ . . . ]

5.X PC5 QoS Flow to SL-DRB Mapping

5.X.X Configuration

When RRC (3GPP TS 38.331 [3]) configures a PC5 QoS flow to SL-DRB mapping rule for a PC5 QoS flow, the SDAP entity shall:
   for unicast of NR SL communication, if the SDAP entity has already been established and there is no stored SL-DRB mapping rule for the PC5 QoS flow and a default SL-DRB is configured:
     construct an end-marker control PDU, as specified in the subclause 6.2.3, for the PC5 QoS flow;
     map the end-marker control PDU to the default SL-DRB;
     submit the end-marker control PDU to the lower layers.
   Editor's Notes: FFS whether the SDAP header should be always present or configurable for SL-DRB
   for unicast of NR SL communication, if the stored PC5 QoS flow to SL-DRB mapping rule is different from the configured PC5 QoS flow to SL-DRB mapping rule for the PC5 QoS flow and the SL-DRB according to the stored PC5 QoS flow to SL-DRB mapping rule is configured by RRC (3GPP TS 38.331 [3]) with the presence of SL SDAP header:
     construct an end-marker control PDU, as specified in the subclause 6.2.3, for the PC5 QoS flow;
     map the end-marker control PDU to the SL-DRB according to the stored PC5 QoS flow to SL-DRB mapping rule;
     submit the end-marker control PDU to the lower layers.
   store the configured PC5 QoS flow to SL-DRB mapping rule for the PC5 QoS flow.

When RRC (3GPP TS 38.331 [3]) releases a PC5 QoS flow to SL-DRB mapping rule for a PC5 QoS flow, the SDAP entity shall:
   remove the PC5 QoS flow to SL-DRB mapping rule for the PC5 QoS flow.

5.X.Y SL-DRB Release

When RRC (3GPP TS 38.331 [3]) or SIB indicates that an SL-DRB is released, the SDAP entity shall:
   remove all PC5 QoS flow to SL-DRB mappings associated with the released SL-DRB based on the subclause 5.X.X.

6 Protocol Data Units, Formats, and Parameters 6.1 Protocol Data Units 6.1.1 Data PDU The SDAP Data PDU is used to convey one or more of followings:
   SDAP header;
   user plane data.

6.1.2 Control PDU a) End-Marker Control PDU

End-Marker control PDU is used by the SDAP entity at UE to indicate that it stops the mapping of the SDAP SDU of the QoS flow indicated by the QFI/PFI to the SL-DRB on which the End-Marker PDU is transmitted.

[ . . . ]

According to FIG. 7-1 of 3GPP TR 38.885 V16.0.0, a TX UE may request a SLRB configuration for a new PC5 QoS flow during a sidelink unicast communication with a RX (Reception) UE. gNB may then provide the SLRB configuration to the TX (Transmission) UE, wherein the SLRB (Sidelink Radio Bearer) configuration may include a PC5 QoS flow to SLRB (or SL-DRB) mapping and SLRB parameters (e.g. SDAP (Service Data Adaptation Protocol, PDCP (Packet Data Convergence Protocol), RLC (Radio Link Control), or LCH (Logical Channel) configuration) for a SL-DRB.

As discussed in the 3GPP RAN2#106 Chairman's note, RAN2#106 agreements on NR SL QoS and SLRB configurations includes:
   For an RRC_CONNECTED UE, for transmission of a new PC5 QoS flow, it may report the QoS information of the PC5 QoS flow via RRC dedicated signalling to the gNB/ng-eNB.
   For an RRC_CONNECTED UE, the gNB/ng-eNB may provide SLRB configurations and configure the mapping of PC5 QoS flow to SLRB via RRC dedicated signalling, based on the QoS information reported by the UE. The UE can establishes/reconfigures the SLRB only after receiving the SLRB configuration. FFS when the UE establishes/reconfigures the SLRB.
   For SL unicast of a UE, the NW-configured/pre-configured SLRBs configurations include the SLRB parameters that are only related to TX, as well as the SLRB parameters that are related to both TX and RX and need to be aligned with the peer UEs.
   For SL unicast, the initiating UE informs the peer UE of SLRB parameters that are related to both TX and RX and need to be aligned with the peer UEs. FFS on the detailed parameters.

According to the above agreements, the TX UE needs to forward SLRB parameters that are related to both TX and RX to the RX UE after receiving these SLRB parameters from gNB. In addition, according to Section 5.X in the 3GPP email discussion [107bis#12] "Running CR to TS37.324 for 5G_V2X_NRSL_v4", gNB may remap a PC5 QoS flow to a second SL-DRB and the SDAP entity associated with the sidelink unicast communication in the TX UE shall store the new PC5 QoS flow to SL-DRB mapping rule for the PC5 QoS flow and transmit an end-marker control PDU (on an old SL-DRB for the PC5 QoS flow) to the RX UE when the RRC layer configures a new PC5 QoS flow to SL-DRB mapping rule for the PC5 QoS flow. The end-marker control PDU is used to indicate the TX UE stops mapping the concerned PC5 QoS flow to the old SL-DRB, which implies the following sidelink data PDUs from the PC5 QoS flow will be transmitted on the second SL-DRB. The TX UE may remap the PC5 QoS flow to the second SL-DRB based on pre-configuration or a system information broadcasted by the gNB when the TX UE performs RRC state transition.

In the case of Uu interface, the procedure for QoS flow to DRB remapping is performed when gNB configures a new QoS flow to DRB mapping for an existing QoS flow. For UL transmission, gNB already knows remapping occurs before receiving the end-marker control PDU (Protocol Data Unit) for the concerned QoS flow from the UE. Thus, gNB can start buffering uplink data PDUs from the concerned QoS flow received on a newly-mapped DRB when remapping occurs, and then delivers these buffered uplink data PDUs upon reception of the end-marker control PDU for the concerned QoS flow on an original DRB. Receiving the end-marker control PDU implies all uplink data PDUs on the original DRB should have been received and delivered to upper layers, and thus in-sequence delivery of the uplink data PDUs from the concerned QoS flow can be ensured during QoS flow to DRB remapping transition.

In the case of PC5 interface, in addition to transmitting an end-marker control PDU to the RX UE, the TX UE also needs to transmit a PC5 RRC (Radio Resource Control) message to inform the RX UE of the new mapping when PC5 QoS flow to SL-DRB remapping occurs. Since the PC5 RRC message and the end-marker control PDU may be transmitted in different sidelink TBs (Transport Blocks), they may be received by the RX UE in different time instants. If the end-marker control PDU is received by the RX UE before reception of the PC5 RRC message (e.g. due to transmission failure to the PC5 RRC message), the end-marker control PDU may be ignored by the RX UE because the RX UE would consider no remapping has occurred to the PC5 QoS flow associated with the end-marker control PDU. As a result, the RX UE would not be triggered to deliver buffered sidelink data PDUs to upper layers, wherein those sidelink data PDUs transmitted on the second SL-DRB would be buffered by the RX UE after the PC5 RRC message indicating PC5 QoS flow to SL-DRB remapping is received from the TX UE later.

The impact to the concerned V2X service is serious because all the following sidelink data PDUs transmitted on the second SL-DRB would be buffered and not delivered to upper layers after PC5 QoS flow to SL-DRB remapping occurs. Although the RX UE could start a timer used to consider when to deliver those buffered sidelink data PDUs to upper layers upon reception of the PC5 RRC message, this latency is not necessary because the RX UE has received the end-marker control PDU already. Therefore, this issue should be considered and solved.

One general solution is that when the RX UE receives the end-marker control PDU for the concerned PC5 QoS flow but the RX UE has not received the PC5 RRC message for reconfiguring PC5 QoS flow to SL-DRB mapping for the concerned PC5 QoS flow yet, the RX UE could expect for reception of the PC5 RRC message. When the PC5 RRC message is received, the RX UE may start to receive sidelink data PDUs from the concerned PC5 QoS flow on the second SL-DRB, and can deliver those received sidelink data PDUs to upper layers without waiting for the end-marker control PDU on the old SL-DRB for the concerned PC5 QoS flow.

Another potential general solution is for the TX UE to transmit the end-marker control PDU to the RX UE when successful transmission of the PC5 RRC message has been confirmed by lower layer(s). For example, the RLC (Radio Link Control) layer may confirm the PC5 RRC message has been transmitted successfully according to one or more RLC STATUS PDUs received from the RX UE, wherein a RLC STATUS PDU may indicate which RLC DATA PDUs have been received. As another example, the MAC (Medium Access Control) layer may confirm the PC5 RRC message has been transmitted successfully according to HARQ feedback received from the RX UE, wherein the HARQ (Hybrid Automatic Repeat Request) feedback indicates a SL TB including a logical channel used for transmission of PC5 RRC message has received by the RX UE.

In response to reception of the PC5 RRC message, the RX UE may reply with a PC5 RRC complete message to the TX UE. Therefore, it may also be feasible for the TX UE to transmit the end-marker control PDU when receiving the PC5 RRC complete message from the RX UE.

In general, both of the above two alternatives can ensure the end-marker control PDU is received by the RX UE after receiving the PC5 RRC message so that the RX UE can start buffering sidelink data PDUs from the concerned PC5 QoS flow received on the second SL-DRB when the PC5 RRC message indicating PC5 QoS flow to SL-DRB remapping is received, and then delivers these buffered sidelink data PDUs to upper layers upon reception of the end-marker control PDU.

Besides, the SDAP (Service Data Adaptation Protocol) entity associated with the sidelink unicast communication in the TX UE shall store the new PC5 QoS flow to SL-DRB mapping rule for the PC5 QoS flow when the RRC layer configures a new PC5 QoS flow to SL-DRB mapping rule for the PC5 QoS flow as specified in Section 5.X of the 3GPP email discussion [107bis#12] "Running CR to TS37.324 for 5G_V2X_NRSL_v4". With the new mapping rule, the TX UE may start transmitting sidelink data PDUs from the PC5 QoS flow on the second SL-DRB. It may also be possible that sidelink data PDUs transmitted on the second SL-DRB may be received by the RX UE earlier than the PC5 RRC message which may indicate PC5 QoS flow to SL-DRB remapping and may optionally include SLRB parameters for the second SL-DRB. There could be two cases for the second SL-DRB, i.e. the second SL-DRB may be an existing SL-DRB or a new SL-DRB to be created.

If the second SL-DRB is an existing SL-DRB (e.g. a default SL-DRB or a non-default SL-DRB), these sidelink data PDUs could be delivered to upper layers directly without being buffered and thus out-of-sequence delivery may occur to the concerned PC5 QoS flow. If the second SL-DRB is a new SL-DRB, the RX UE would not be able to decode these sidelink data PDUs because the SLRB parameters for the new SL-DRB included in the PC5 RRC message have not been received by the RX UE yet. As a result, these sidelink data PDUs would be lost. How to avoid out-of-sequence delivery or data loss during PC5 QoS flow to SL-DRB remapping transition should be considered.

In general, a potential solution is for the TX UE to start transmitting sidelink data PDUs on the second SL-DRB when successful transmission of the PC5 RRC message has been confirmed by lower layer(s) or when receiving a PC5 RRC complete message corresponding to the PC5 RRC message from the RX UE.

Since the SDAP entity associated with the sidelink unicast communication shall submit the end-marker control PDU to the lower layers for transmission and store the new PC5 QoS flow to SL-DRB mapping rule for the concerned PC5 QoS flow when the RRC layer or the TX UE configures a new PC5 QoS flow to SL-DRB mapping rule for the PC5 QoS flow, another way to describe the above solutions is for the RRC layer or the TX UE to configure the new PC5 QoS flow to SL-DRB mapping rule for the PC5 QoS flow to the SDAP entity when successful transmission of the PC5 RRC message has been confirmed by lower layer(s) or when a PC5 RRC complete message is received from the RX UE.

Figure 14:
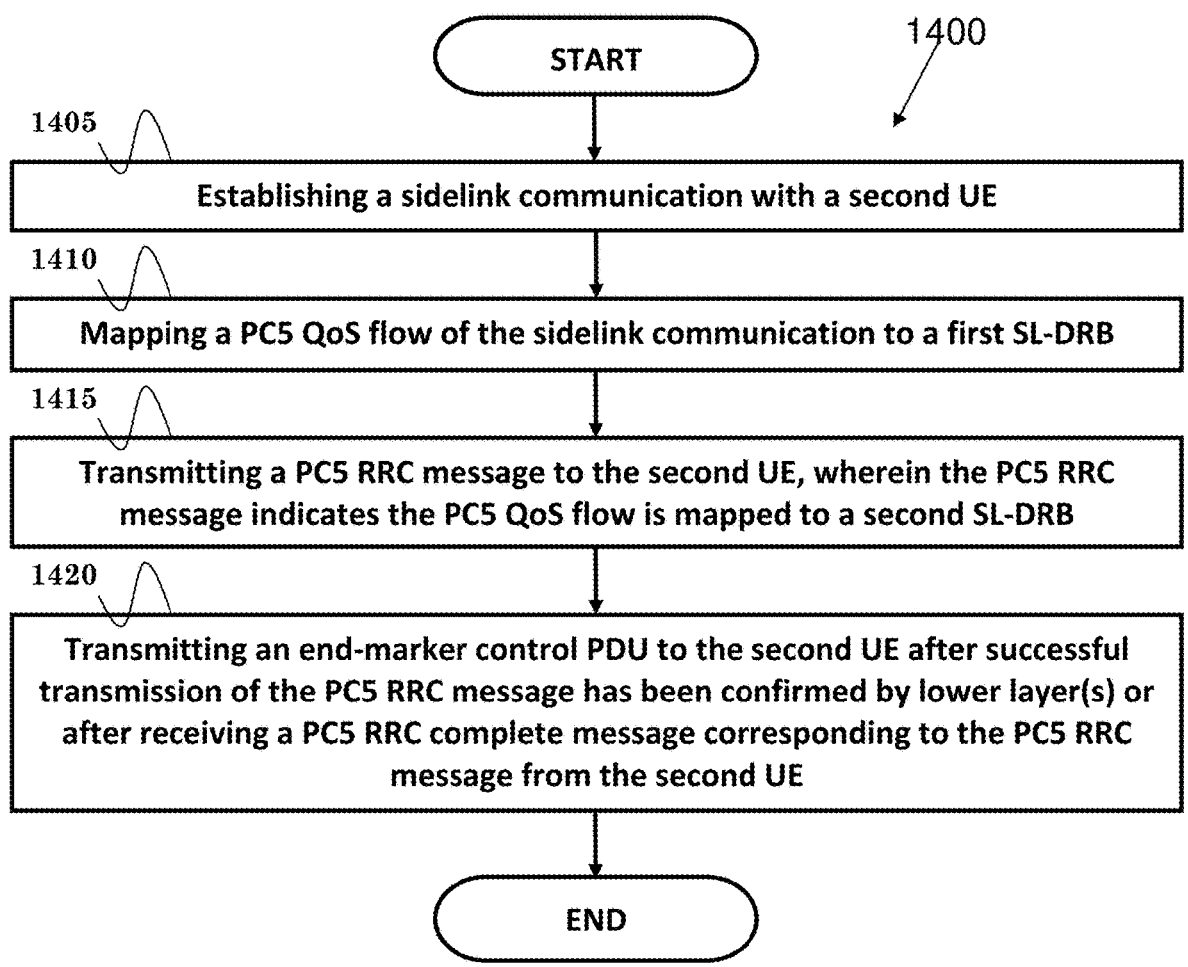
FIG. 14 is a flow chart according to one exemplary embodiment.

FIG. 14 is a flow chart 1400 according to one exemplary embodiment from the perspective of a first UE to support PC5 QoS flow to SL-DRB remapping. In step 1405, the first UE establishes a sidelink communication with a second UE. In step 1410, the first UE maps a PC5 QoS flow of the sidelink communication to a first SL-DRB. In step 1415, the first UE transmits a PC5 RRC message to the second UE, wherein the PC5 RRC message indicates the PC5 QoS flow is mapped to a second SL-DRB. In step 1320, the first UE transmits an end-marker control PDU to the second UE after successful transmission of the PC5 RRC message has been confirmed by lower layer(s) or after receiving a PC5 RRC complete message corresponding to the PC5 RRC message from the second UE.

Referring back to FIGS. 3 and 4, in one exemplary embodiment of a first UE to support PC5 QoS flow to SL-DRB remapping. The first UE 300 includes a program code 312 stored in the memory 310. The CPU 308 could execute program code 312 to enable the first UE (i) to establish a sidelink communication with a second UE, (ii) to map a PC5 QoS flow of the sidelink communication to a first SL-DRB, (iii) to transmit a PC5 RRC message to the second UE, wherein the PC5 RRC message indicates the PC5 QoS flow is mapped to a second SL-DRB, and (iv) to transmit an end-marker control PDU to the second UE after successful transmission of the PC5 RRC message has been confirmed by lower layer(s) or after receiving a PC5 RRC complete message corresponding to the PC5 RRC message from the second UE. Furthermore, the CPU 308 can execute the program code 312 to perform all of the above-described actions and steps or others described herein.

Figure 15:
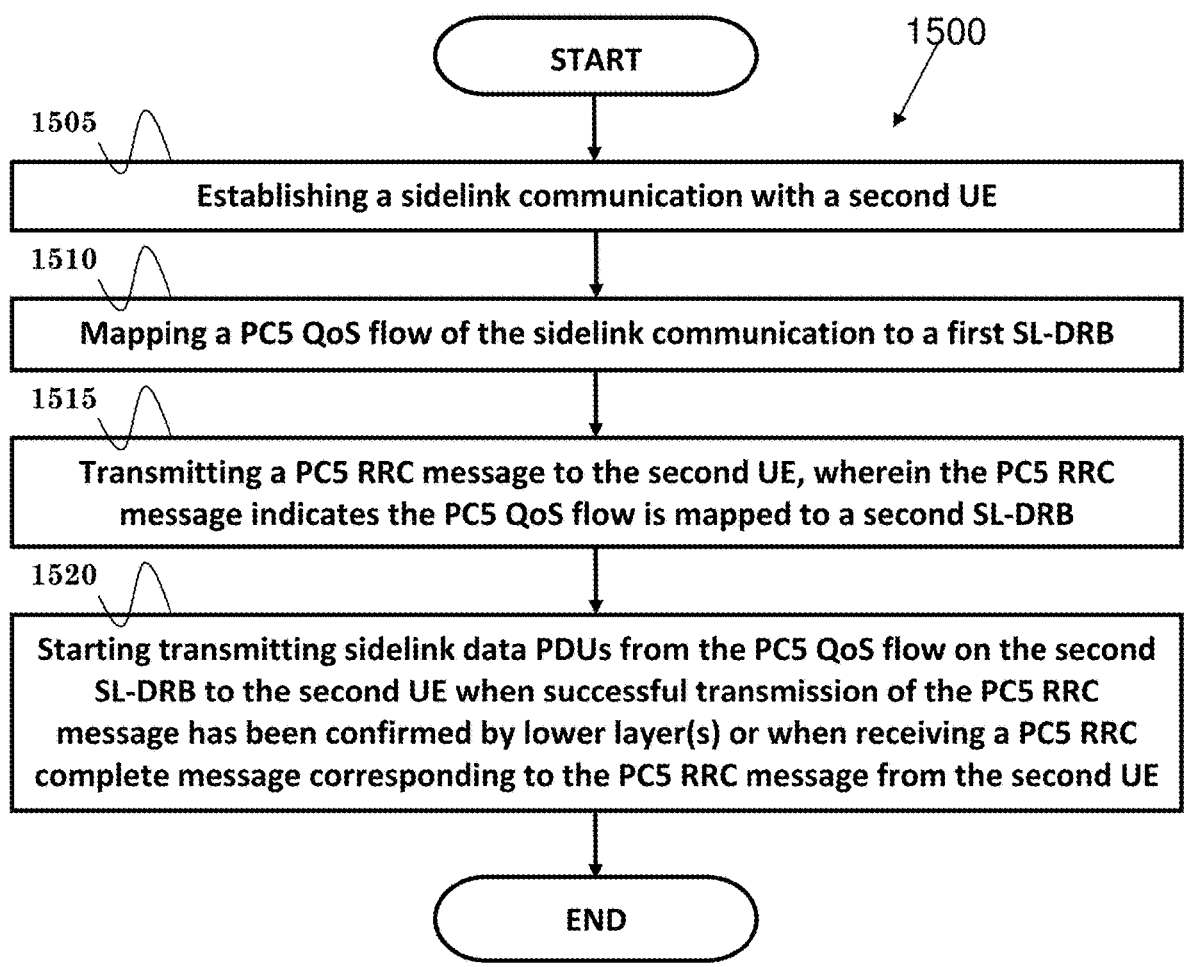
FIG. 15 is a flow chart according to one exemplary embodiment.

FIG. 15 is a flow chart 1500 according to one exemplary embodiment from the perspective of a first UE to support PC5 QoS flow to SL-DRB remapping. In step 1505, the first UE establishes a sidelink communication with a second UE. In step 1510, the first UE maps a PC5 QoS flow of the sidelink communication to a first SL-DRB. In step 1515, the first UE transmits a PC5 RRC message to the second UE, wherein the PC5 RRC message indicates the PC5 QoS flow is mapped to a second SL-DRB. In step 1520, the first UE starts transmitting sidelink data PDUs from the PC5 QoS flow on the second SL-DRB to the second UE when successful transmission of the PC5 RRC message has been confirmed by lower layer(s) or when receiving a PC5 RRC complete message corresponding to the PC5 RRC message from the second UE.

Referring back to FIGS. 3 and 4, in one exemplary embodiment of a first UE to support PC5 QoS flow to SL-DRB remapping. The first UE 300 includes a program code 312 stored in the memory 310. The CPU 308 could execute program code 312 to enable the first UE (i) to establish a sidelink communication with a second UE, (ii) to map a PC5 QoS flow of the sidelink communication to a first SL-DRB, (iii) to transmit a PC5 RRC message to the second UE, wherein the PC5 RRC message indicates the PC5 QoS flow is mapped to a second SL-DRB, and (iv) to start transmitting sidelink data PDUs from the PC5 QoS flow on the second SL-DRB to the second UE when successful transmission of the PC5 RRC message has been confirmed by lower layer(s) or when receiving a PC5 RRC complete message corresponding to the PC5 RRC message from the second UE. Furthermore, the CPU 308 can execute the program code 312 to perform all of the above-described actions and steps or others described herein.

In the context of embodiments illustrated in FIGS. 14-15 and discussed above, in one embodiment, the first UE could remap the PC5 QoS flow of the sidelink communication to the second SL-DRB after successful transmission of the PC5 RRC message has been confirmed by lower layer(s) or after receiving the PC5 RRC complete message from the second UE.

FIG. 16 is a flow chart 1600 according to one exemplary embodiment from the perspective of a first UE to support PC5 QoS flow to SL-DRB remapping. In step 1605, the first UE establishes a sidelink communication with a second UE, wherein an SDAP entity is created by the first UE for the sidelink communication. In step 1610, the first UE maps a PC5 QoS flow of the sidelink communication to a first SL-DRB. In step 1615, the first UE transmits a PC5 RRC message to the second UE, wherein the PC5 RRC message indicates the PC5 QoS flow is mapped to a second SL-DRB. In step 1620, the first UE configures a new PC5 QoS flow to SL-DRB mapping rule for the PC5 QoS flow to the SDAP entity when successful transmission of the PC5 RRC message has been confirmed by lower layer(s) or when receiving a PC5 RRC complete message corresponding to the PC5 RRC message from the second UE, wherein the new PC5 QoS flow to SL-DRB mapping rule indicates the PC5 QoS flow is mapped to the second SL-DRB.

Referring back to FIGS. 3 and 4, in one exemplary embodiment of a first UE to support PC5 QoS flow to SL-DRB remapping. The first UE 300 includes a program code 312 stored in the memory 310. The CPU 308 could execute program code 312 to enable the first UE (i) to establishes a sidelink communication with a second UE, wherein an SDAP entity is created by the first UE for the sidelink communication, (ii) to map a PC5 QoS flow of the sidelink communication to a first SL-DRB, (iii) to transmit a PC5 RRC message to the second UE, wherein the PC5 RRC message indicates the PC5 QoS flow is mapped to a second SL-DRB, and (iv) to configure a new PC5 QoS flow to SL-DRB mapping rule for the PC5 QoS flow to the SDAP entity when successful transmission of the PC5 RRC message has been confirmed by lower layer(s) or when receiving a PC5 RRC complete message corresponding to the PC5 RRC message from the second UE, wherein the new PC5 QoS flow to SL-DRB mapping rule indicates the PC5 QoS flow is mapped to the second SL-DRB. Furthermore, the CPU 308 can execute the program code 312 to perform all of the above-described actions and steps or others described herein.

In the context of embodiments illustrated in FIGS. 14-16 and discussed above, in one embodiment, the first UE could also receive a RRC message from a network node, wherein the RRC message indicates the PC5 QoS flow is mapped to the second SL-DRB.

In one embodiment, the network node may be a base station (e.g. gNB). The first UE may be in RRC_CONNECTED. The sidelink communication may be a sidelink unicast communication. The RRC message may include SLRB parameters that are related to both transmission and reception on the second SL-DRB. Alternatively, the RRC message may include SLRB parameters that are only related to transmission on the second SL-DRB.

In one embodiment, the PC5 RRC message may include SLRB parameters that are related to both transmission and reception on the second SL-DRB. The end-marker control PDU may include an identity of the PC5 QoS flow, e.g. PFI (PC5 QoS Flow Identifier). The end-marker control PDU could be transmitted on the first SL-DRB.

In one embodiment, the SDAP entity could submit the end-marker control PDU to the lower layers for transmission when it is configured with the new PC5 QoS flow to SL-DRB mapping rule for the PC5 QoS flow. Furthermore, the SDAP entity could store the new PC5 QoS flow to SL-DRB mapping rule for the PC5 QoS flow when it is configured with the new PC5 QoS flow to SL-DRB mapping rule for the PC5 QoS flow. In addition, the SDAP entity could remap the PC5 QoS flow of the sidelink communication to the second SL-DRB when the SDAP entity is configured with the new PC5 QoS flow to SL-DRB mapping rule.

Figure 17:
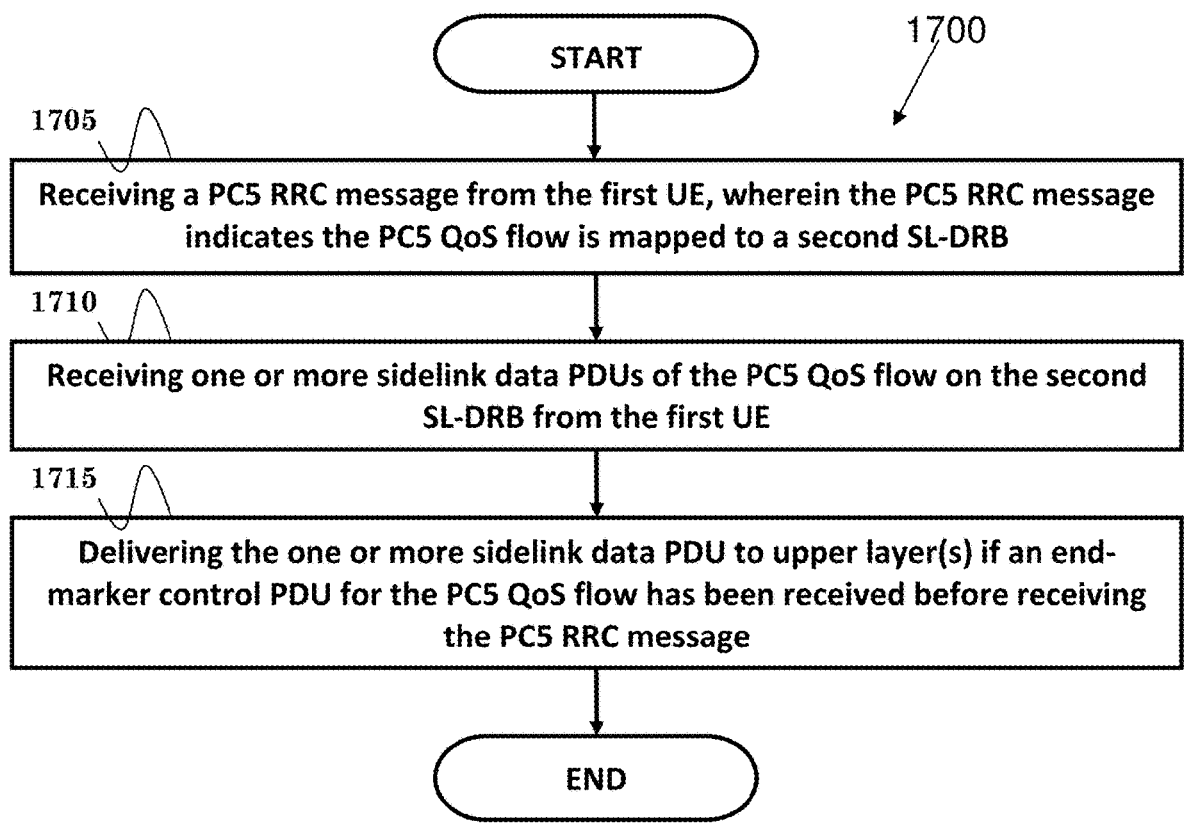
FIG. 17 is a flow chart according to one exemplary embodiment.

FIG. 17 is a flow chart 1700 according to one exemplary embodiment from the perspective of a second UE to perform sidelink reception for a PC5 QoS flow of a sidelink communication with a first UE. In step 1705, the second UE receives a PC5 RRC message from the first UE, wherein the PC5 RRC message indicates the PC5 QoS flow is mapped to a second SL-DRB. In step 1710, the second UE receives one or more sidelink data PDUs of the PC5 QoS flow on the second SL-DRB from the first UE. In step 1715, the second UE delivers the one or more sidelink data PDU to upper layer(s) if an end-marker control PDU for the PC5 QoS flow has been received before receiving the PC5 RRC message.

In one embodiment, the second UE could buffer the one or more sidelink data PDU and does not deliver them to upper layer(s) if the end-marker control PDU for the PC5 QoS flow has not been received yet. The second could also deliver the buffered one or more sidelink data PDU to upper layer(s) if the end-marker control PDU is received after receiving the PC5 RRC message and the second UE does not receive the end-marker control PDU before receiving the PC5 RRC message.

In one embodiment, the PC5 QoS flow could be mapped to a first SL-DRB before receiving the PC5 RRC message. The sidelink communication could be a sidelink unicast communication. The PC5 RRC message may include SLRB parameters that are related to both transmission and reception on the second SL-DRB. The end-marker control PDU may include an identity of the PC5 QoS flow, e.g. PFI (PC5 QoS Flow Identifier). The network node may be a base station (e.g. gNB).

Referring back to FIGS. 3 and 4, in one exemplary embodiment of a second UE to perform sidelink reception for a PC5 QoS flow of a sidelink communication with a first UE. The second UE 300 includes a program code 312 stored in the memory 310. The CPU 308 could execute program code 312 to enable the second UE (i) to receive a PC5 RRC message from the first UE, wherein the PC5 RRC message indicates the PC5 QoS flow is mapped to a second SL-DRB, (ii) to receive one or more sidelink data PDUs of the PC5 QoS flow on the second SL-DRB from the first UE, and (iii) to deliver the one or more sidelink data PDU to upper layer(s) if an end-marker control PDU for the PC5 QoS flow has been received before receiving the PC5 RRC message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) to support PC5 QoS (Quality of Service) flow to SL-DRB (Sidelink-Data Radio Bearer) remapping, comprising:
   establishing a sidelink communication with a second UE;
   mapping a PC5 QoS flow of the sidelink communication to a first SL-DRB;
   transmitting a PC5 RRC (Radio Resource Control) message to the second UE, wherein the PC5 RRC message indicates the PC5 QoS flow is mapped to a second SL-DRB;
   transmitting an end-marker control PDU (Protocol Data Unit) to the second UE after successful transmission of the PC5 RRC message has been confirmed by lower layer(s) or after receiving a PC5 RRC complete message corresponding to the PC5 RRC message from the second UE; and
   remapping the PC5 QoS flow of the sidelink communication to the second SL-DRB after successful transmission of the PC5 RRC message has been confirmed by lower layer(s) or after receiving the PC5 RRC complete message from the second UE.

2. The method of claim 1, further comprising:
   receiving a RRC message from a network node, wherein the RRC message indicates the PC5 QoS flow is mapped to the second SL-DRB.

3. The method of claim 2, wherein the network node is a base station.

4. The method of claim 2, wherein the RRC message includes SLRB (Sidelink Radio Bearer) parameters that are related to both transmission and reception on the second SL-DRB.

5. The method of claim 1, wherein the sidelink communication is a sidelink unicast communication.

6. The method of claim 1, wherein the PC5 RRC message includes SLRB (Sidelink Radio Bearer) parameters that are related to both transmission and reception on the second SL-DRB.

7. The method of claim 1, wherein the end-marker control PDU includes an identity of the PC5 QoS flow.

8. The method of claim 1, wherein the end-marker control PDU is transmitted on the first SL-DRB.

9. A UE (User Equipment), comprising:
   a control circuit;
   a processor installed in the control circuit; and
   a memory installed in the control circuit and operatively coupled to the processor;
   wherein the processor is configured to execute a program code stored in the memory to:
      establish a sidelink communication with a second UE;
      map a PC5 QoS (Quality of Service) flow of the sidelink communication to a first SL-DRB (Sidelink-Data Radio Bearer);
      transmit a PC5 RRC (Radio Resource Control) message to the second UE, wherein the PC5 RRC message indicates the PC5 QoS flow is mapped to a second SL-DRB;
      transmit an end-marker control PDU (Protocol Data Unit) to the second UE after successful transmission of the PC5 RRC message has been confirmed by lower layer(s) or after receiving a PC5 RRC complete message corresponding to the PC5 RRC message from the second UE; and
      remap the PC5 QoS flow of the sidelink communication to the second SL-DRB after successful transmission of the PC5 RRC message has been confirmed by lower layer(s) or after receiving the PC5 RRC complete message from the second UE.

10. The UE of claim 9, wherein the processor is configured to execute a program code stored in the memory to:
    receive a RRC message from a network node, wherein the RRC message indicates the PC5 QoS flow is mapped to the second SL-DRB.

11. The UE of claim 10, wherein the network node is a base station.

12. The UE of claim 10, wherein the RRC message includes SLRB (Sidelink Radio Bearer) parameters that are related to both transmission and reception on the second SL-DRB.

13. The UE of claim 9, wherein the sidelink communication is a sidelink unicast communication.

14. The UE of claim 9, wherein the PC5 RRC message includes SLRB (Sidelink Radio Bearer) parameters that are related to both transmission and reception on the second SL-DRB.

15. The UE of claim 9, wherein the end-marker control PDU includes an identity of the PC5 QoS flow.

16. The UE of claim 9, wherein the end-marker control PDU is transmitted on the first SL-DRB.

* * * * *